US012359138B2

(12) United States Patent
Kim et al.

(10) Patent No.: US 12,359,138 B2
(45) Date of Patent: Jul. 15, 2025

(54) METHOD AND SYSTEM FOR PRODUCING REFINED HYDROCARBONS FROM WASTE PLASTIC PYROLYSIS OIL

(71) Applicants: SK INNOVATION CO., LTD., Seoul (KR); SK GEO CENTRIC CO., LTD., Seoul (KR)

(72) Inventors: Yong Woon Kim, Daejeon (KR); Seo Yeong Kang, Daejeon (KR); Soo Kil Kang, Daejeon (KR); Min Gyoo Park, Daejeon (KR); Young Moo Park, Daejeon (KR); Min Woo Shin, Daejeon (KR); Jae Hwan Lee, Daejeon (KR); Jin Seong Jang, Daejeon (KR); Sang Hwan Jo, Daejeon (KR)

(73) Assignees: SK INNOVATION CO., LTD., Seoul (KR); SK GEO CENTRIC CO., LTD., Seoul (KR)

( * ) Notice: Subject to any disclaimer, the term of this patent is extended or adjusted under 35 U.S.C. 154(b) by 0 days.

(21) Appl. No.: 18/442,105

(22) Filed: Feb. 15, 2024

(65) Prior Publication Data

US 2024/0352358 A1    Oct. 24, 2024

(30) Foreign Application Priority Data

Apr. 19, 2023  (KR) .................. 10-2023-0051637
Oct. 12, 2023  (KR) .................. 10-2023-0135758

(51) Int. Cl.
*C10G 69/02*   (2006.01)
*B01D 3/14*    (2006.01)
(Continued)

(52) U.S. Cl.
CPC .............. *C10G 69/02* (2013.01); *B01D 3/14* (2013.01); *B01D 17/045* (2013.01);
(Continued)

(58) Field of Classification Search
None
See application file for complete search history.

(56) References Cited

U.S. PATENT DOCUMENTS 1,612,180 A * 12/1926 De Groote ............. C10G 33/02
                                                                516/190
3,935,295 A    1/1976 La Hue et al.
(Continued)

FOREIGN PATENT DOCUMENTS

CN    101613620 A  * 12/2009 ............... C10G 1/10
GB      2580539 A  *  7/2020 ............. B29B 17/00
(Continued)

OTHER PUBLICATIONS

Machine translation CN 101613620. retrieved May 30, 2024 (Year: 2024).*
(Continued)

*Primary Examiner* — In Suk C Bullock
*Assistant Examiner* — Alyssa L Cepluch
(74) *Attorney, Agent, or Firm* — IP & T GROUP LLP

(57) ABSTRACT

Embodiments of the present disclosure relate to a method and system for producing refined hydrocarbons from waste plastic pyrolysis oil. The method and system for producing refined hydrocarbons from waste plastic pyrolysis oil according to the embodiments of the present disclosure may minimize formation of an ammonium salt ($NH_4Cl$) and may prevent an adhesion phenomenon of impurity particles in a reactor in a refining process of waste plastic pyrolysis oil containing impurities including chlorine and nitrogen. In addition, the method and system for producing refined hydrocarbons according to the embodiments of the present disclosure may have excellent refining efficiency and may implement a long-term operation of a process because deactivation of a catalyst used in the process is prevented, and may produce refined hydrocarbons having a low content (Continued)

of impurities and a low content of olefins from waste plastic pyrolysis oil.

19 Claims, 2 Drawing Sheets

(51) Int. Cl.
  *B01D 17/04* (2006.01)
  *B01D 17/06* (2006.01)
  *C10G 1/00* (2006.01)
  *C10G 1/10* (2006.01)
  *C10G 32/02* (2006.01)

(52) U.S. Cl.
  CPC .......... *B01D 17/047* (2013.01); *B01D 17/06* (2013.01); *C10G 1/002* (2013.01); *C10G 1/10* (2013.01); *C10G 32/02* (2013.01); *C10G 2300/1003* (2013.01); *C10G 2300/202* (2013.01); *C10G 2300/4075* (2013.01)

(56) References Cited

U.S. PATENT DOCUMENTS

| | | | |
|---|---|---|---|
| 6,120,678 | A | 9/2000 | Stephenson et al. |
| 6,150,577 | A * | 11/2000 | Miller ............... C10G 1/10 585/734 |
| 6,228,239 | B1 | 5/2001 | Manalastas et al. |
| 11,473,017 | B1 | 10/2022 | Horlacher |
| 11,939,531 | B2 | 3/2024 | Paasikallio et al. |
| 2009/0000985 | A1* | 1/2009 | Van Wees ............ C10G 7/003 208/81 |
| 2009/0294324 | A1 | 12/2009 | Brandvold et al. |
| 2012/0184787 | A1* | 7/2012 | Miller ............ C10M 175/0025 585/1 |
| 2014/0053455 | A1 | 2/2014 | Goldman |
| 2014/0262728 | A1 | 9/2014 | Karanikas |
| 2015/0267127 | A1 | 9/2015 | Yeganeh et al. |
| 2015/0274611 | A1 | 10/2015 | Zhu et al. |
| 2015/0337087 | A1 | 11/2015 | Zhou et al. |
| 2019/0177620 | A1 | 6/2019 | Posmyk et al. |
| 2019/0211274 | A1* | 7/2019 | Soliman ................ C02F 1/463 |
| 2019/0241838 | A1 | 8/2019 | Scheibel et al. |
| 2020/0255748 | A1 | 8/2020 | Soliman et al. |
| 2021/0189249 | A1 | 6/2021 | Timken |
| 2021/0269721 | A1 | 9/2021 | Fareid et al. |
| 2022/0135449 | A1 | 5/2022 | Cantley et al. |
| 2022/0387908 | A1 | 12/2022 | Andreu et al. |
| 2023/0323224 | A1 | 10/2023 | Adam et al. |
| 2024/0059629 | A1 | 2/2024 | Goyheneix et al. |
| 2024/0351871 | A1 | 10/2024 | Jo et al. |
| 2024/0351872 | A1 | 10/2024 | Kim et al. |
| 2024/0352356 | A1 | 10/2024 | Kim et al. |

FOREIGN PATENT DOCUMENTS

| | | | |
|---|---|---|---|
| KR | 10-1916404 B1 | 11/2018 | |
| KR | 10-2206106 B1 | 1/2021 | |
| KR | 10-2021-0057722 A | 5/2021 | |
| KR | 10-2023-0010197 A | 1/2023 | |
| WO | 2019004560 A1 | 1/2019 | |
| WO | WO-2021204819 A1 * | 10/2021 | ............. B01J 20/08 |
| WO | 2023279022 A1 | 1/2023 | |
| WO | 2023/009398 A1 | 2/2023 | |

OTHER PUBLICATIONS

Park et al. "Production of clean oil with low levels of chlorine and olefins in a continuous two-stage pyrolysis of a mixture of waste low-density polyethylene and polyvinyl chloride" Energy 157 (2018) 402-411 (Year: 2018).
Office Action for the U.S. Appl. No. 18/407,459 issued by the USPTO on Apr. 15, 2024.
Notice of Allowance for the U.S. Appl. No. 18/427,821 issued by the USPTO on Jun. 5, 2024.
Office Action for the U.S. Appl. No. 18/429,454 issued by the USPTO on May 6, 2024.
Office Action for the U.S. Appl. No. 18/433,413 issued by the USPTO on Apr. 26, 2024.
Office Action for the U.S. Appl. No. 18/434,807 issued by the USPTO on May 22, 2024.
Office Action for the U.S. Appl. No. 18/434,811 issued by the USPTO on Apr. 22, 2024.
Notice of Allowance for the U.S. Appl. No. 18/442,103 issued by the USPTO on May 8, 2024.
Office Action for the U.S. Appl. No. 18/442,111 issued by the USPTO on May 8, 2024.
Office Action for the U.S. Appl. No. 18/442,122 issued by the USPTO on Apr. 26, 2024.
Office Action for the U.S. Appl. No. 18/444,787 issued by the USPTO on May 23, 2024.
Extended European Search Report for European Patent Application No. 24163089.6 issued by the European Patent Office on Sep. 11, 2024.
Offiece Action for U.S. Appl. No. 18/429,454 issued by the USPTO on Dec. 5, 2024.
Office Action for U.S. Appl. No. 18/429,454 issued by the USPTO on Mar. 18, 2025.
Office Action for U.S. Appl. No. 18/433,403 issued by the USPTO on Apr. 24, 2025.

* cited by examiner

METHOD AND SYSTEM FOR PRODUCING REFINED HYDROCARBONS FROM WASTE PLASTIC PYROLYSIS OIL

CROSS-REFERENCE TO RELATED APPLICATIONS

This application claims priority under 35 U.S.C. § 119 to Korean Patent Application No. 10-2023-0051637, filed on Apr. 19, 2023, and Korean Patent Application No. 10-2023-0135758, filed on Oct. 12, 2023, the disclosures of which are incorporated herein by reference in their entirety.

TECHNICAL FIELD

Embodiments of the present disclosure generally relate to a method and system for producing refined hydrocarbons from waste plastic pyrolysis oil.

BACKGROUND

Waste plastics, which are produced using petroleum as a feedstock, have a low rate of recycling, such as energy recovery in power generation, or mechanical recycling, and a significant amount of waste plastics is simply incinerated or landfilled. These wastes take a long time to degrade in nature, which causes contamination of the soil and serious environmental pollution. A method for recycling waste plastics includes pyrolysis of the waste plastics and converting the pyrolyzed waste plastics into usable oil. The oil produced by pyrolyzing waste plastics in this way is called waste plastic pyrolysis oil.

However, waste plastic pyrolysis oil may be blended in a limited amount with a high-value-added fuel such as gasoline or diesel oil because it has a higher content of impurities such as chlorine, nitrogen, and metals than oil produced from crude oil by a general method. In particular, a chlorine component causes corrosion of a reactor itself or after being converted into HCl during a process of producing refined hydrocarbons.

A method for removing impurities such as chlorine, nitrogen, oxygen, and metals contained in waste plastic pyrolysis oil, a method of performing dechlorination, denitrification, deoxygenation by reacting waste plastic pyrolysis oil with hydrogen in the presence of a hydrotreating catalyst, and a method of removing chlorine contained in waste plastic pyrolysis oil by adsorption using a chlorine adsorbent, or the like are known.

Specifically, U.S. Pat. No. 3,935,295 describes a technology for removing chloride contaminants from various hydrocarbon oils. The technology is a conventional technology of hydrotreating oil in the presence of a hydrotreating catalyst in a first reactor, introducing a fluid containing hydrogen chloride (HCl) produced at this time and refined oil into a second reactor, and then removing a chlorine component contained in the fluid by adsorption using an adsorbent.

However, as described in the conventional technology, when oil is allowed to react with hydrogen in the presence of a hydrotreating catalyst, a chlorine compound such as hydrogen chloride produced together with refined oil, and a nitrogen compound react with each other to form an ammonium salt ($NH_4Cl$), and the ammonium salt various causes process issues. Specifically, the ammonium salt formed inside the reactor by the reaction of oil and hydrogen not only causes corrosion of the reactor to reduce durability, but also causes various process issues such as an occurrence of a differential pressure and a resulting reduction in process efficiency. In addition, when the process is operated for a long period of time, adhesion of impurity particles in the waste plastic pyrolysis oil occurs inside the reactor, causing various process issues.

Therefore, there is a need to develop a method capable of producing refined hydrocarbons that may be blended with a high-value-added fuel in large quantities from waste plastic pyrolysis oil without the process issues described above.

SUMMARY

An embodiment of the present disclosure is directed to providing a method and system for producing refined hydrocarbons from waste plastic pyrolysis oil that minimize formation of an ammonium salt ($NH_4Cl$) in a refining process of waste plastic pyrolysis oil containing impurities including chlorine and nitrogen.

Another embodiment of the present disclosure is directed to providing a method and system for producing refined hydrocarbons from waste plastic pyrolysis oil that have excellent refining efficiency and may implement a long-term operation because activity of a catalyst is maintained for a long time.

Still another embodiment of the present disclosure is directed to providing a method and system for producing refined hydrocarbons from waste plastic pyrolysis oil that may prevent an adhesion phenomenon of impurity particles in a reactor.

Still another embodiment of the present disclosure is directed to providing a method and system for producing, from waste plastic pyrolysis oil, refined hydrocarbons that have a significantly low content of impurities such as chlorine, nitrogen, oxygen, and metals and a significantly low content of olefins, and have excellent quality.

In an embodiment of the present disclosure, a method for producing refined hydrocarbons from waste plastic pyrolysis oil includes a dehydration operation which includes applying a voltage to a first mixed solution obtained by mixing waste plastic pyrolysis oil, washing water, and a demulsifier to dehydrate the first mixed solution; a hydrotreating operation including hydrotreating a second mixed solution obtained by mixing the dehydrated first mixed solution from the dehydration operation and a sulfur source to produce refined oil from which impurities are removed; and an isomerization operation including subjecting to isomerization the refined oil from which impurities are removed in the hydrotreating operations.

In the dehydration operation, the waste plastic pyrolysis oil may be mixed in a greater volume than the washing water.

In the dehydration operation, the waste plastic pyrolysis oil and the washing water may be mixed in the first mixed solution at a volume ratio of 1:0.001 to 1:0.5.

In the dehydration operation, the waste plastic pyrolysis oil and the demulsifier may be mixed in the first mixed solution at a volume ratio of 1:0.000001 to 1:0.001.

The voltage may be applied as an alternating current or a combination of an alternating current and a direct current.

The voltage may be applied through a vertical electrode.

The method for producing refined hydrocarbons from waste plastic pyrolysis oil may further include, after the application of the voltage in the dehydration operation, removing a rag layer from the first mixed solution.

The dehydration operation may be performed under a temperature condition of 20° C. to 300° C.

A ratio of a content of moisture in the waste plastic pyrolysis oil to a content of moisture in the first mixed solution dehydrated in the dehydration operation may be 1:0.0001 to 1:0.9.

In the dehydration operation, the dehydrated first mixed solution may be additionally dehydrated by condensation of moisture.

A weight ratio of nitrogen to chlorine in the second mixed solution may be 1:1 to 1:10.

The sulfur source may include a sulfur-containing oil.

The sulfur-containing oil may be included in an amount of less than 0.5 parts by weight with respect to 100 parts by weight of the first mixed solution dehydrated in the dehydration operation.

The sulfur source may include one or two or more sulfur-containing organic compounds selected from a disulfide-based compound, a sulfide-based compound, a sulfonate-based compound, and a sulfate-based compound.

The hydrotreating may be performed in the presence of a molybdenum-based hydrotreating catalyst.

The molybdenum-based hydrotreating catalyst may be a catalyst in which a molybdenum-based metal, or a metal including one or two or more selected from nickel, cobalt, and tungsten, and a molybdenum-based metal are supported on a support.

The molybdenum-based hydrotreating catalyst may include a molybdenum-based sulfide hydrotreating catalyst.

The hydrotreating may be performed under a pressure condition of 50 bar to 150 bar.

The method for producing refined hydrocarbons from waste plastic pyrolysis oil may further include, after the hydrotreating operation, subjecting a stream including the refined oil from which impurities are removed to gas-liquid separation in a separator and then washing the gas-liquid separated stream with water.

In the isomerization operation, a refined fraction separated by distilling the refined oil from which impurities are removed in the hydrotreating operation is subjected to the isomerization.

In the isomerization operation, mixed oil obtained by mixing the refined oil from which impurities are removed in the hydrotreating operation and petroleum hydrocarbons is subjected to the isomerization.

These and other features, aspects, and advantages of the embodiments of the present disclosure will become apparent to the skilled person from the following detailed description, the drawings, and the claims.

DETAILED DESCRIPTION OF EMBODIMENTS

Figure 1:
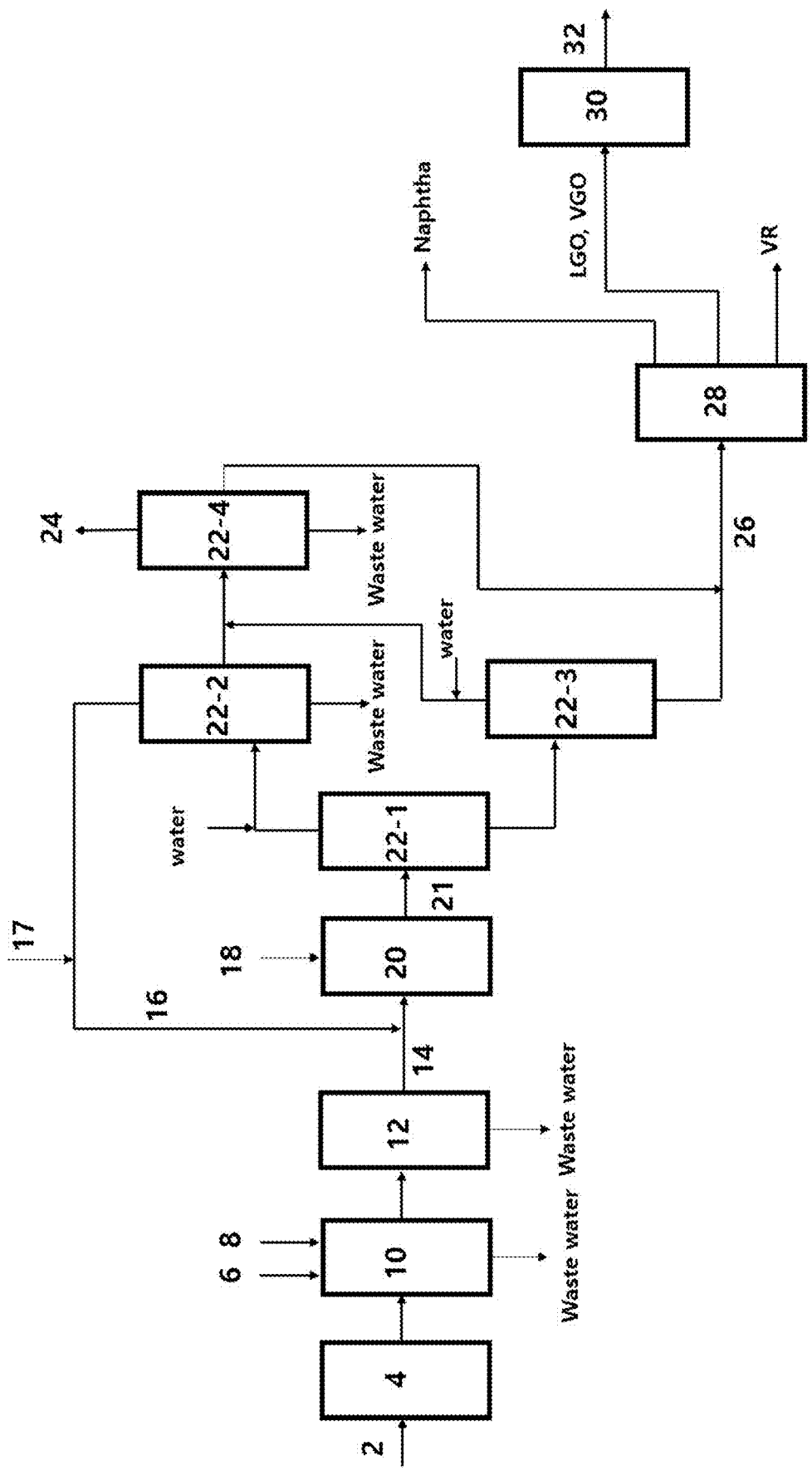
FIG. 1 is a process diagram of a method for producing refined hydrocarbons from waste plastic pyrolysis oil according to an embodiment of the present disclosure.

The advantages and features of the present disclosure and methods for accomplishing them will become apparent from the embodiments described below in detail with reference to the accompanying drawings. However, the present disclosure is not limited to the embodiments to be disclosed below, but may be implemented in various different forms. These embodiments will be provided only in order to make the present disclosure complete and allow those skilled in the art to completely recognize the scope of the present disclosure, and the present disclosure will be defined by the scope of the claims.

Unless defined otherwise, all terms (including technical and scientific terms) used in the present specification have the same meanings as commonly understood by those skilled in the art to which the present disclosure pertains.

Unless the context clearly indicates otherwise, the singular forms of the terms used in the present specification may be interpreted as including the plural forms.

A numerical used in the present specification includes upper and lower limits and all values within these limits, increments logically derived from a form and span of a defined range, all double limited values, and all possible combinations of the upper and lower limits in the numerical range defined in different forms. Unless otherwise specifically defined in the specification of the present disclosure, values out of the numerical range that may occur due to experimental errors or rounded values also fall within the defined numerical range.

The expression "comprise(s)" described in the present specification is intended to be an open-ended transitional phrase having an equivalent meaning to "include(s)", and does not exclude elements, materials, or steps, all of which are not further recited herein.

The term "reactor" used in the present specification may refer to a device that may be used in processes such as production, refining, separation, and mixing of waste plastic pyrolysis oil. For example, the reactor may be interpreted to mean a device such as a dehydrator, a coalescer, a hydrotreating reactor, or a separator used in a refining process of waste plastic pyrolysis oil.

The term "vertical electrode" used in the present specification may refer to an electrode erected in a vertical direction with respect to the ground, and the term "horizontal electrode" may refer to an electrode laid horizontally with respect to the ground.

In a method and system for producing refined hydrocarbons from waste plastic pyrolysis oil according to the present disclosure, a dehydration process including water washing, demulsification, voltage application, and the like is performed to reduce issues such as catalyst deactivation due to moisture dispersed in the form of an emulsion in waste plastic pyrolysis oil, and corrosion of a reactor due to chlorine contained in moisture and a low pH of moisture. In addition, a hydrotreating process of removing impurities contained in waste plastic pyrolysis oil through a hydrotreating reaction and an isomerization process of subjecting refined oil from which impurities are removed through the above processes to isomerization are performed. The methods for producing refined hydrocarbons from waste plastic pyrolysis oil according to the embodiments of the present disclosure may stably produce refined hydrocarbons having a low content of impurities from waste plastic pyrolysis oil by organically combining the above series of temporal processes.

Hereinafter, a method and system for producing refined hydrocarbons from waste plastic pyrolysis oil will be described in detail.

Referring to FIG. 1, an embodiment of the present disclosure provides a method for producing refined hydrocarbons from waste plastic pyrolysis oil. The method includes a dehydration operation (S1). The dehydration operation includes applying a voltage to a first mixed solution in a dehydrator 10. The first mixed solution is obtained by mixing in the dehydrator 10 waste plastic pyrolysis oil 2 from a feed tank 4, washing water 6, and a demulsifier 8.

Applying the voltage to the first mixed solution is done by using electrodes immersed in the solution which causes the water molecules to decompose into hydrogen gas at the cathode and oxygen gas at the anode.

The method further comprises a hydrotreating operation (S2). The hydrotreating operation includes hydrotreating a second mixed solution obtained by mixing the first mixed solution dehydrated in the dehydration operation and a sulfur source to produce refined oil from which impurities are removed. Hydrotreating may be performed in a hydrotreating reactor 20.

The method further comprises an isomerization operation (S3) subjecting to isomerization the refined oil from which impurities are removed. The isomerization may be performed in an isomerization reactor 30.

The dehydration operation is an operation of applying a voltage to a first mixed solution obtained by mixing in the dehydrator 10 waste plastic pyrolysis oil, washing water, and a demulsifier to dehydrate the first mixed solution.

Waste plastic pyrolysis oil contains moisture, and moisture in pyrolysis oil may cause issues such as deactivation of a hydrotreating catalyst and corrosion of a reactor. In addition, since water-soluble impurities are contained in moisture, dehydration is required to remove moisture. Moisture present in the form of an emulsion in waste plastic pyrolysis oil may be easily removed by performing the dehydration operation.

The waste plastic pyrolysis oil according to an embodiment of the present disclosure may be a mixture of hydrocarbon oils produced by pyrolyzing waste plastics, and in this case, the waste plastics may include solid or liquid wastes related to synthetic polymer compounds such as waste synthetic resins, waste synthetic fibers, waste synthetic rubber, and waste vinyl.

The mixture of hydrocarbon oils according to an embodiment of the present disclosure may contain impurities such as a chlorine compound, a nitrogen compound, an oxygen compound, a metal compound, and char-derived particles, in addition to the hydrocarbon oils, may contain impurities in the form of compounds in which chlorine, nitrogen, oxygen, or a metal is bonded to hydrocarbons, and may contain paraffinic, olefinic, naphthenic, or aromatic hydrocarbons.

The washing water according to an embodiment of the present disclosure may serve to increase the probability of contact between emulsion-type moisture present in the waste plastic pyrolysis oil. In addition, a basic compound may be added to the washing water to remove a water-soluble acidic material contained in moisture, and the basic compound may be sodium hydroxide (NaOH), but is not particularly limited thereto. The waste plastic pyrolysis oil according to an embodiment of the present disclosure may be mixed in a greater volume than the washing water, and specifically, the waste plastic pyrolysis oil and the washing water may be mixed in the first mixed solution at a volume ratio of 1:0.001 to 1:0.5, more specifically, 1:0.005 to 1:0.4, and most specifically, 1:0.01 to 1:0.3. When the volume ratio satisfies the above range, water washing is sufficiently performed, and thus, impurities in the pyrolysis oil may be significantly reduced, and costs required to remove washing water to be mixed may be minimized.

The demulsifier according to an embodiment of the present disclosure may be one or a mixture of two or more selected from the group consisting of polyethylene glycol, tert-butanol, acetone, alkylnaphthalene sulfonate, alkylbenzene sulfonate, a nonionic alkoxylated alkyl phenol resin, polyalkylene oxide, and polyoxyethylene sorbitan ester, but is not limited thereto. The demulsifier may be added with the washing water.

In the first mixed solution according to an embodiment of the present disclosure, the waste plastic pyrolysis oil and the demulsifier may be mixed at a volume ratio of 1:0.000001 to 1:0.001, specifically, 1:0.000002 to 1:0.0005, and more specifically, 1:0.000003 to 1:0.0001. When the volume ratio satisfies the above range, the emulsion may be decomposed with minimal impact on the quality of pyrolysis oil.

The demulsifier according to an embodiment of the present disclosure may have a weight average molecular weight of 200 to 2,000, specifically, 300 to 1,000, and more specifically, 400 to 800. When the weight average molecular weight satisfies the above range, it is easy to mix the demulsifier with the waste plastic pyrolysis oil and the washing water under conditions where the dehydration process is performed, and thus, the decomposition efficiency of the moisture emulsion may be increased.

The moisture in the form of an emulsion contained in the first mixed solution in which the waste plastic pyrolysis oil, the washing water, and the demulsifier are mixed is still difficult to remove because it is stable. Therefore, a voltage may be applied to the first mixed solution to facilitate removal of moisture.

The voltage according to an embodiment of the present disclosure may be applied as a dual polarity, alternating current, direct current or a combination of an alternating current and a direct current. Some impurity particles contained in the waste plastic pyrolysis oil have polarities, and therefore, when a direct current voltage is applied, polarized impurity particles are accumulated on a specific electrode, and when the process is performed for a long period of time, the impurities may adhere to the electrode. However, when an alternating current voltage is applied, the polarity of the electrode changes periodically, and therefore, the adhesion phenomenon of the impurity particles may be prevented. In addition, a frequency of the alternating current according to an embodiment of the present disclosure may be a single frequency or a combination of two or more frequencies. As a specific example, in the case of the single frequency, an alternating current with a frequency of 60 Hz may be applied, and in the case of the combination of two or more frequencies, alternating currents with frequencies of 50 Hz and 60 Hz may be applied alternately, but the embodiments of the present disclosure are not limited thereto.

The voltage according to an embodiment of the present disclosure may be applied through a vertical electrode. In a case where the impurity particles are accumulated on the electrode during a mixed solution preparation process or a voltage application process, when the impurities particles are not artificially washed, the impurity particles may adhere to the electrode after a long period of time. However, when a vertical electrode is used, the adhesion phenomenon of the impurity particles may be prevented in advance because the impurity particles are not accumulated on the electrode but fall to the bottom of the reactor due to gravity even without an additional washing operation.

A magnitude of the voltage according to an embodiment of the present disclosure may be 0.1 to 50 kV, specifically, 1 to 30 kV, and more specifically, 5 to 20 kV, but is not limited thereto.

The dehydration according to an embodiment of the present disclosure may be performed by any method known in the art. As a non-limiting example, after the application of the voltage, water may be removed by draining a water layer which is oil-water separated. Water may also be removed in a gas-liquid separator 22-1 (separator 1).

Metal impurities in the waste plastic pyrolysis oil stabilize the emulsion, hinder oil-water separation, and help form a stable emulsion layer, commonly called a rag layer. Such a rag layer may be formed between a desalinated oil layer at an upper portion of the first mixed solution and a water layer at a lower portion of the first mixed solution, and may be gradually thickened during a continuous dehydration process. An excessively thickened rag layer may be discharged to an equipment at the hydrotreating process together with desalinated oil. This reduces the desalination effect of the desalinated oil and reduces the efficiency of the process. In addition, the rag layer may be discharged together with water and may cause issues in a wastewater treatment process. Therefore, it is preferable to remove the rag layer formed between the desalinated oil layer and the water layer.

Therefore, a method for producing refined hydrocarbons from waste plastic pyrolysis oil according to an embodiment of the present disclosure may further include, after the application of the voltage in the dehydration operation, removing a rag layer from the first mixed solution. The removal of the rag layer may be performed through a pipe penetrating through a wall of a dehydrator 10 and connected to the outside after measuring a change in density of the mixed solution by a density meter in the dehydrator to determine a formation location and a thickness of the rag layer, but the embodiments are not limited thereto.

In the dehydration operation according to an embodiment of the present disclosure, after dehydrating the first mixed solution, the dehydrated first mixed solution may be additionally dehydrated by condensation of moisture.

The additional dehydration according to an embodiment of the present disclosure may be performed by supplying the dehydrated first mixed solution to a coalesce 12. Specifically, the residual moisture contained in the dehydrated first mixed solution may be removed through condensation by a collection filter in the coalescer, but this is only a specific example and the embodiments of the present disclosure are not limited thereto. As the content of moisture in the waste plastic pyrolysis oil is further reduced through the additional dehydration, deactivation of the catalyst due to moisture may be prevented, and the process stability and the quality of refined hydrocarbons may be improved.

A ratio of a content of moisture in the waste plastic pyrolysis oil to a content of moisture in the dehydrated first mixed solution according to an embodiment of the present disclosure may be 1:0.0001 to 1:0.9, specifically, 1:0.0005 to 1:0.5, and more specifically, 1:0.001 to 1:0.1. When the ratio satisfies the above range, a risk of trouble occurring in subsequent processes such as hydrotreating may be significantly reduced, and high-quality refined oil that meets specifications may be produced as a feedstock for a distillation process described below, but the embodiments of the present disclosure are not limited thereto.

The dehydration operation according to an embodiment of the present disclosure may be performed at a pressure of 50 bar or less. When the dehydration operation is performed at a pressure of 50 bar or less, moisture in the pyrolysis oil may be easily removed, and the process stability may be secured. Specifically, the dehydration operation may be performed at a pressure of 30 bar or less, more specifically, 20 bar or less, and without limitation, 5 bar or more.

The dehydration operation according to an embodiment of the present disclosure may be performed at a temperature of 20° C. to 300° C. When the temperature satisfies the above range, the decomposition of the emulsion and the condensation of moisture are smoothly performed, and thus, the dehydration efficiency may be improved. Specifically, the dehydration operation may be performed at a temperature of 50° C. to 250° C., and more specifically, 80° C. to 200° C.

In order to improve the dehydration efficiency in the dehydration operation according to an embodiment of the present disclosure, one or more additional processes selected from the group consisting of centrifugation and distillation may be performed before and/or after the dehydration. The additional processes described above may be performed by a method known in the art, but are not limited thereto.

Next, the hydrotreating operation is an operation of hydrotreating a second mixed solution obtained by mixing the first mixed solution dehydrated in the dehydration operation and a sulfur source to produce refined oil from which impurities are removed.

The second mixed solution according to an embodiment of the present disclosure may have a concentration of chlorine (Cl) of 10 ppm or more, specifically, 100 ppm or more, more specifically, 200 ppm or more, and without limitation, 3,000 ppm or less as an upper limit, but is not limited thereto.

In the second mixed solution according to an embodiment of the present disclosure, a weight ratio of nitrogen to chlorine may be 1:0.1 to 1:10, specifically, 1:0.5 to 1:5, and more specifically, 1:1 to 1:2, but the above weight ratio is only a specific example of what may be included in the waste plastic pyrolysis oil, and a composition of the waste plastic pyrolysis oil is not limited thereto.

The hydrotreating according to an embodiment of the present disclosure may be performed in the hydrotreating reactor 20 by feeding hydrogen in the second mix solution under a condition in which a ratio of hydrogen to the second mixed solution is 100 $Nm^3/Sm^3$ to 5,000 $Nm^3/Sm^3$, specifically, 500 $Nm^3/Sm^3$ to 3,000 $Nm^3/Sm^3$, and more specifically, 1,000 $Nm^3/Sm^3$ to 1,500 $Nm^3/Sm^3$. When this condition is satisfied, impurities may be effectively removed, the high activity of the hydrotreating catalyst may be maintained for a long period of time, and the process efficiency may be improved.

The sulfur source refers to a sulfur source capable of continuously supplying a sulfur component during the refining process.

In the hydrotreating operation, the second mixed solution containing the sulfur source is prepared, such that during the refining process, deactivation of a molybdenum-based hydrotreating catalyst due to lack of the sulfur source and high-temperature operation may be suppressed, and the catalytic activity may be maintained.

The sulfur source according to an embodiment of the present disclosure may include sulfur-containing oil. The sulfur-containing oil refers to oil composed of hydrocarbons containing sulfur obtained from crude oil as a feedstock. The sulfur-containing oil is not particularly limited as long as it is oil containing sulfur, and the sulfur-containing oil may be, for example, light gas oil, straight-run naphtha, vacuum naphtha, pyrolysis naphtha, straight-run kerosene, vacuum kerosene, pyrolysis kerosene, straight-run gas oil, vacuum gas oil, pyrolysis gas oil, sulfur-containing waste tire oil, and any mixture thereof.

When waste tire oil is included as the sulfur-containing oil according to an embodiment of the present disclosure, a high content of sulfur contained in waste tires may be converted into oil together with hydrocarbons and may preferably serve as a sulfur source for the waste plastic pyrolysis oil. In addition, diverting the waste tire oil into the sulfur source for the waste plastic pyrolysis oil is advantageous in terms of reducing the environmental load due to recycling of waste tires and maintaining the catalytic activity for a long period of time.

Specifically, the sulfur-containing oil may be light gas oil (LGO) with a specific gravity of 0.7 to 1. When this sulfur-containing oil is used, the sulfur-containing oil may be uniformly mixed with the dehydrated first mixed solution, and high hydrotreating efficiency may be exhibited. Specifically, the specific gravity may be 0.75 to 0.95, and more specifically, 0.8 to 0.9. The sulfur-containing oil may contain 100 ppm or more of sulfur. When the sulfur component is contained in an amount of less than 100 ppm, a content of the sulfur component supplied is small, such that the effect of preventing deactivation of the molybdenum-based hydrotreating catalyst may be insufficient. Specifically, the sulfur component may be contained in an amount of 800 ppm or more, more specifically, 8,000 ppm or more, and without limitation, 200,000 ppm or less.

The second mixed solution according to an embodiment of the present disclosure may contain 100 ppm or more of sulfur. As in the case of the sulfur-containing oil, when the sulfur component is contained in the second mixed solution in an amount of less than 100 ppm, the content of the sulfur component supplied is small, such that the effect of preventing deactivation of the molybdenum-based hydrotreating catalyst may be insufficient. Specifically, the sulfur component may be contained in an amount of 800 ppm or more, more specifically, 8,000 ppm or more, and without limitation, 200,000 ppm or less.

The sulfur-containing oil according to an embodiment of the present disclosure may be included in an amount of less than 0.5 parts by weight with respect to 100 parts by weight of the first mixed solution dehydrated in the dehydration operation. Specifically, the sulfur-containing oil may be included in an amount of less than 0.1 parts by weight, more specifically, less than 0.05 parts by weight, and without limitation, more than 0.01 parts by weight. As the sulfur-containing oil is included in an amount of less than 0.5 parts by weight, the concentration of chlorine (Cl) or nitrogen (N) contained in the waste plastic pyrolysis oil is diluted, such that a formation rate of an ammonium salt ($NH_4Cl$) may be controlled, and the process stability may be improved.

The sulfur source according to an embodiment of the present disclosure may include one or two or more sulfur-containing organic compounds selected from a disulfide-based compound, a sulfide-based compound, a sulfonate-based compound, and a sulfate-based compound. Specifically, the sulfur source may include one or a mixture of two or more selected from dimethyl disulfide, dimethyl sulfide, polysulfide, dimethyl sulfoxide (DMSO), methyl methanesulfonate, ethyl methanesulfonate, propyl methanesulfonate, propenyl propenesulfonate, propenyl cyanoethansulfonate, ethylene sulfate, bicyclo-glyoxal sulfate, and methyl sulfate. However, these compounds are only presented as examples and the embodiments of the present disclosure are not limited thereto.

The sulfur-containing organic compound according to an embodiment of the present disclosure may be included in an amount of 0.01 to 0.1 parts by weight with respect to 100 parts by weight of the first mixed solution dehydrated in the dehydration operation. Specifically, the sulfur-containing organic compound may be included in an amount of 0.02 to 0.08 parts by weight, and more specifically, 0.03 to 0.06 parts by weight. When the sulfur-containing organic compound is included in an amount of less than 0.01 parts by weight, the content of the sulfur component supplied is small, such that the effect of preventing deactivation of the molybdenum-based hydrotreating catalyst may be insufficient.

The hydrotreating refers to a hydrogenation reaction that occurs by adding a reaction gas including hydrogen gas ($H_2$) to the second mixed solution in which the first mixed solution dehydrated in the dehydration operation and the sulfur source are mixed in the presence of a molybdenum-based hydrotreating catalyst. Specifically, the hydrotreating may refer to hydrotreating, which is known in the related art, including a hydrodesulfurization reaction, a hydrocracking reaction, a hydrodechlorination reaction, a hydrodenitrogenation reaction, a hydrodeoxygenation reaction, and a hydrodemetallization reaction. Through the hydrotreating, impurities including chlorine (Cl), nitrogen (N), and oxygen (O), and some olefins may be removed, other metal impurities may also be removed, and a by-product containing the impurities is produced.

The by-product is produced by reacting impurities such as chlorine (Cl), nitrogen (N), sulfur(S), or oxygen (O) contained in the waste plastic pyrolysis oil with hydrogen gas ($H_2$). Specifically, the by-product may include hydrogen sulfide gas ($H_2S$), hydrogen chloride (HCl), ammonia ($NH_3$), water vapor ($H_2O$), or the like, and in addition, may include unreacted hydrogen gas ($H_2$), and a trace of methane ($CH_4$), ethane ($C_2H_6$), propane ($C_3H_8$), butane ($C_4H_{10}$), or the like.

The molybdenum-based hydrotreating catalyst according to an embodiment of the present disclosure may be a catalyst in which a molybdenum-based metal, or a metal including one or two or more selected from nickel, cobalt, and tungsten, and a molybdenum-based metal are supported on a support. The molybdenum-based hydrotreating catalyst has high catalytic activity during hydrotreating, and the molybdenum-based hydrotreating catalysts may be used alone or, if necessary, in the form of a two-way catalyst combined with a metal such as nickel, cobalt, or tungsten.

As the support according to an embodiment of the present disclosure, alumina, silica, silica-alumina, titanium oxide, a molecular sieve, zirconia, aluminum phosphate, carbon, niobia, or a mixture thereof may be used, but the embodiments of present disclosure are not limited thereto.

The molybdenum-based hydrotreating catalyst according to an embodiment of the present disclosure may include a molybdenum-based sulfide hydrotreating catalyst. For example, the molybdenum-based hydrotreating catalyst may include molybdenum sulfide (MoS) or molybdenum disulfide ($MOS_2$), but is not limited thereto, and may include a known molybdenum-based sulfide hydrotreating catalyst.

The reaction gas according to an embodiment of the present disclosure may further include hydrogen sulfide gas ($H_2S$). The hydrogen sulfide gas ($H_2S$) included in the reaction gas may act as a sulfur source, and may regenerate the activity of the molybdenum-based hydrotreating catalyst deactivated during the refining process together with the sulfur source mixed with the waste plastic pyrolysis oil.

The hydrotreating according to an embodiment of the present disclosure may be performed at a pressure of 150 bar or less. Specifically, the hydrotreating may be performed at a pressure of 120 or less, more specifically, 100 bar or less, and without limitation, 50 bar or more. When the hydrotreating is performed under a pressure condition of more than 150 bar, as ammonia and hydrogen chloride are produced in excess during the hydrotreating, an ammonium salt formation temperature increases, and as a result, a differential pressure of a reactor or the like in the process may be easily caused, and the process stability may be significantly reduced. By controlling the contents of nitrogen and chlorine in the waste plastic pyrolysis oil, the increase in ammonium salt formation temperature may be partially suppressed even under a condition of a pressure of more than 150 bar. However, this case is not appropriate because the waste plastic pyrolysis oil targeted in the refining process according to embodiments of the present disclosure may be extremely limited thereto.

The hydrotreating according to an embodiment of the present disclosure may be performed at a temperature of 150° C. to 500° C. When the temperature satisfies the above range, the hydrotreating efficiency may be improved. Specifically, the hydrotreating may be performed at a temperature of 200° C. to 400° C.

The hydrotreating according to an embodiment of the present disclosure may be performed in multiple stages, and as a specific example, may be performed in two stages. When the hydrotreating is performed in two stages, a first stage may be performed at a lower temperature than a second stage. In this case, the first stage may be performed at a temperature of 150° C. to 300° C., and specifically, 200° C. to 250° C., and the second stage may be performed at a temperature of 300° C. to 500° C., and specifically, 350° C. to 400° C., but embodiments of the present disclosure are not limited thereto.

The method for producing refined hydrocarbons from waste plastic pyrolysis oil according to an embodiment of the present disclosure may further include, after the hydrotreating operation, subjecting a stream including the refined oil from which impurities are removed to gas-liquid separation and then washing the gas-liquid separated stream with water.

The stream including the refined oil from which impurities are removed according to an embodiment of the present disclosure may contain hydrogen chloride, ammonia, unreacted hydrogen gas, and the like, in addition to the refined oil from which impurities are removed discharged from a rear end of the reactor where the hydrotreating operation is performed.

Through the gas-liquid separation according to an embodiment of the present disclosure, from the stream including the refined oil from which impurities are removed, ammonia and hydrogen chloride produced by the hydrotreating may be removed, and unreacted hydrogen gas may be recovered.

The gas-liquid separation according to an embodiment of the present disclosure may be performed by a method known in the art using a separator 22-1, to 22-4 (See separators 1 to 4 in FIG. 1), but is not particularly limited.

The gas-liquid separation according to an embodiment of the present disclosure may be performed twice to four times, specifically, three or four times, and more specifically, four times. Please See Separators 1 to 4 in FIG. 1. When the above range is satisfied, the formation of the ammonium salt may be minimized even under a low-temperature condition for oil-water separation because the refined oil contains traces of $NH_3$ and HCl. In addition, an oil refining process using the refined oil as a feedstock may be stably performed without adding an additional salt remover to the refined oil later.

A gas stream produced as a result of the gas-liquid separation according to an embodiment of the present disclosure may include off-gas containing light hydrocarbons, hydrogen sulfide, ammonia, hydrogen chloride, or the like, and unreacted hydrogen gas. According to a method known in the art, the off-gas and the unreacted hydrogen gas are separated, and the separated unreacted hydrogen gas is recirculated in the process, and the off-gas is treated through a process described below and may be used as a feedstock or discharged into the atmosphere.

Through the water washing according to an embodiment of the present disclosure, a salt included in the gas stream may be dissolved and removed, or salt formation may be suppressed by dissolving gas that may form a salt. The water washing may be performed by a method known in the art, but is not particularly limited.

The water washing according to an embodiment of the present disclosure may be performed twice to four times, and specifically, twice or three times. When the above range is satisfied, the salt removal and salt formation suppression effect may be sufficiently exhibited, such that high-quality refined oil may be obtained, and the process stability may be secured.

The method for producing refined hydrocarbons from waste plastic pyrolysis oil according to an embodiment of the present disclosure may further include, after the subjecting of the stream including the refined oil from which impurities are removed to the gas-liquid separation and then the washing of the gas-liquid separated stream with water: combusting the separated off-gas; and processing uncombusted off-gas.

The off-gas according to an embodiment of the present disclosure may contain C1-C4 light hydrocarbons, hydrogen sulfide ($H_2S$), ammonia ($NH_3$), and the like. Therefore, in order to use the off-gas as fuel, it is required to combust the off-gas to remove hydrogen sulfide ($H_2S$), ammonia ($NH_3$), and the like. Exhaust gas containing sulfur dioxide ($SO_2$), nitrogen dioxide ($NO_2$), and the like, produced by combustion of the off-gas may be discharged into the atmosphere after performing caustic scrubbing to meet emission standards.

In addition, after the combusting of the separated off-gas, uncombusted off-gas may be discharged as wastewater by being subjected to sour water stripping, adsorption, biological treatment, oxidation, amine scrubbing, or caustic scrubbing.

Next, the isomerization operation is a process of subjecting the refined oil from which impurities are removed to isomerization.

The isomerization according to an embodiment of the present disclosure may be performed in the presence of an isomerization catalyst. As the isomerization catalyst according to an embodiment of the present disclosure, molecular sieves (zeolite (aluminosilicate), silicoaluminophosphate (SAPO), ALPO, and the like) may be used, and more specifically, molecular sieves known in the art such as medium pore molecular sieves, for example, ZSM family (for example, ZSM-5, ZSM-11, ZSM-12, ZSM-22, ZSM-23, ZSM-35, ZSM-48, and the like), SAPO-11, and SAPO-41, and large-sized porous molecular sieves (faujasite, zeolite beta, mordenite, and the like) may be used.

Moreover, the isomerization catalyst according to an embodiment of the present disclosure may be a catalyst in which a hydrogenation/dehydrogenation metal component is supported on the molecular sieve to promote isomerization. Representative examples of the metal component include Group VIII noble metal components such as Pt and/or Pd, but the embodiments of the present disclosure are not limited thereto, and other metal components, for example, Group VIII non-noble metals such as Co and Ni, and Group VIB metals such as Mo and W, may be used alone or in combination. The amount of the metal component may be 0.05 to 0.8 wt %, and specifically, 0.1 to 0.6 wt %, with respect to the total weight of the isomerization catalyst, but is not limited thereto.

The isomerization according to an embodiment of the present disclosure may be performed at a temperature of 100° C. to 400° C. Specifically, the isomerization may be performed at a temperature of 300° C. to 400° C. In addition, the isomerization according to an embodiment of the present disclosure may be performed at a pressure of 10 bar to 200 bar. Specifically, the isomerization may be performed at a pressure of 100 bar to 200 bar. When the temperature and pressure satisfy the above ranges, the isomerization efficiency may be improved.

In the isomerization operation according to an embodiment of the present disclosure, a refined fraction separated by distilling the refined oil from which impurities are removed in the hydrotreating operation may be subjected to the isomerization. The distilling operation may be performed in fractionator 28.

The refined fraction according to an embodiment of the present disclosure may be naphtha, kerosene, light gas oil, vacuum gas oil (VGO), or residue, but is not limited thereto.

In the isomerization operation in the isomerization reactor 30 according to an embodiment of the present disclosure, mixed oil obtained by mixing the refined oil 1 from which impurities are removed in the hydrotreating operation and petroleum hydrocarbons may be subjected to the isomerization. In addition, mixed oil obtained by mixing the refined fraction and petroleum hydrocarbons may also be subjected to the isomerization.

The petroleum hydrocarbon refers to a mixture of naturally occurring hydrocarbons or oil separated from the mixture, and specifically, may be one or a mixture of two or more selected from the group consisting of kerosene, light gas oil, heavy gas oil, and vacuum gas oil (VGO) derived from crude oil, but is not limited thereto.

In the related art, when isomerization was performed using only petroleum hydrocarbons as a feedstock, the catalyst was adversely affected by impurities such as sulfur (S) and nitrogen (N), and the isomerization catalyst performance did not last for a long time. However, the refined oil from which impurities are removed is included, such that this issue may be solved. In addition, the refined oil has an excellent viscosity index, which is one of the main qualities of lube base oil, and is thus advantageous for use as lube base oil.

The mixed oil according to an embodiment of the present disclosure may include the refined oil from which impurities are removed in the hydrotreating operation in an amount of 5 wt % or more, 10 wt % or more, 20 wt % or more, 40 wt % or more, or 50 wt % or more, with respect to the total weight of the mixed oil, and an upper limit of the content of the refined oil from which impurities are removed in the hydrotreating operation may be 95 wt % or less, but is not limited thereto. The embodiments of the present disclosure are not limited to the above range. However, in general, the lower the content of impurities in the refined oil, the higher the proportion of refined oil that may be included in the mixed oil.

In addition, various embodiments of the present disclosure provide a system for producing refined hydrocarbons from waste plastic pyrolysis oil, the system including: a dehydrator performing dehydration by applying a voltage to a first mixed solution obtained by mixing waste plastic pyrolysis oil, washing water, and a demulsifier; a hydrotreating reactor into which the first mixed solution dehydrated in the dehydrator and hydrogen gas are introduced and in which refined oil from which impurities are removed is produced by hydrotreating the first mixed solution in the presence of a hydrotreating catalyst; and an isomerization device (also referred to as isomerization reactor) performing isomerization on the refined oil from which impurities are removed.

The contents described for the method for producing refined hydrocarbons from waste plastic pyrolysis oil may be equally applied to the description of the system for producing refined hydrocarbons from waste plastic pyrolysis oil to the extent of overlap.

The dehydrator according to an embodiment of the present disclosure may be provided with a vertical electrode. The number of vertical electrodes provided in the dehydrator according to an embodiment of the present disclosure may be at least two, specifically, four or more, more specifically, six or more, and as an upper limit, twenty or fewer, but is not limited thereto.

The dehydrator according to an embodiment of the present disclosure may include a coalescer therein. The coalescer is a device that collects fine droplets to form large droplets, and any device commonly used in the industry may be used. The coalescer is not particularly limited.

The first mixed solution dehydrated in the dehydrator may be introduced into the coalescer according to an embodiment of the present disclosure, and an additionally dehydrated first mixed solution may be produced. When a dehydrator including the coalescer is used, the additionally dehydrated first mixed solution is also introduced into the hydrotreating reactor together with the hydrogen gas.

The system for producing refined hydrocarbons from waste plastic pyrolysis oil according to an embodiment of the present disclosure may further include a separator for subjecting the refined oil from which impurities are removed to gas-liquid separation, the refined oil being produced in the hydrotreating reactor.

The number of separators according to an embodiment of the present disclosure may be two to four, specifically, three or four, and more specifically, four. When the above range is satisfied, the formation of the ammonium salt may be minimized even under a low-temperature condition for oil-water separation because the refined oil contains traces of $NH_3$ and $HCl$. In addition, a distillation process using the refined oil as a feedstock may be stably performed without adding an additional salt remover to the refined oil later.

The system for producing refined hydrocarbons from waste plastic pyrolysis oil according to an embodiment of the present disclosure may further include a recycle gas compressor recovering unreacted hydrogen gas from the separated gas stream from the separator and adding the recovered unreacted hydrogen gas to the hydrotreating reactor.

Hereinafter, a method and system for producing refined hydrocarbons from waste plastic pyrolysis oil according to embodiments of the present disclosure will be described in more detail with reference to Examples. However, the following Examples are only reference examples for describing the embodiments in detail, and the embodiments of the present disclosure are not limited thereto and may be implemented in various forms. Unless otherwise defined, all technical terms and scientific terms used herein have the same meaning as commonly understood by those skilled in the art to which the present disclosure pertains. In addition, the terms used in the present disclosure are only to effectively describe specific Examples, but are not intended to limit the embodiments of the present disclosure.

Example 1

Waste plastic pyrolysis oil, washing water, and polyethylene glycol having a weight average molecular weight of 500 were added to a dehydrator under conditions of 150° C. and 10 bar at a volume ratio of 1:0.25:0.0001, and stirring was performed, thereby preparing a first mixed solution. The first mixed solution was separated into oil and water by applying an alternating voltage of 15 kV through a vertical electrode, and then dehydration was performed by removing the water layer.

At this time, in the waste plastic pyrolysis oil, the content of moisture was about 5,000 ppm or more, and impurities at high concentrations of 500 ppm or more of nitrogen (N), 200 ppm or more of chlorine (Cl), and 20 vol % or more of olefins were contained.

A second mixed solution was prepared by mixing dimethyl disulfide in an amount of 0.04 parts by weight with respect to 100 parts by weight of the first mixed solution dehydrated in the dehydrator, and then the second mixed solution was hydrotreated under conditions of 300° C. and 70 bar, thereby producing refined oil from which impurities were removed.

Mixed oil obtained by mixing the refined oil from which impurities were removed and oil having a boiling point of 350° C. or higher derived from crude oil at a weight ratio of 1:1 was subjected to isomerization under conditions of 350° C. and 160 bar, thereby obtaining refined hydrocarbons.

Examples 2 and 3

Refined hydrocarbons were obtained under the same conditions as those in Example 1, except that the waste plastic pyrolysis oil, washing water, and polyethylene glycol were added to the dehydrator at the volume ratio shown in Table 1 in Example 1.

Example 4

Refined hydrocarbons were obtained under the same conditions as those in Example 1, except that a direct current voltage was applied through a horizontal electrode in Example 1.

Example 5

Refined hydrocarbons were obtained under the same conditions as those in Example 1, except that the dehydration of the first mixed solution was performed under a temperature condition of 120° C. in Example 1.

Example 6

Refined hydrocarbons were obtained under the same conditions as those in Example 1, except that the waste plastic pyrolysis oil and polyethylene glycol were added at a volume ratio of 1:0.00001 and the hydrotreating was performed under a condition of a pressure of 180 bar in Example 5.

Example 7

Refined hydrocarbons were obtained under the same conditions as those in Example 1, except that after the first mixed solution was dehydrated, the first mixed solution was additionally dehydrated through a coalescer in Example 1.

Comparative Example 1

Refined hydrocarbons were obtained under the same conditions as those in Example 1, except that washing water was not added in Example 1.

Comparative Example 2

Refined hydrocarbons were obtained under the same conditions as those in Example 1, except that polyethylene glycol was not added in Example 1.

Comparative Example 3

Refined hydrocarbons were obtained under the same conditions as those in Example 1, except that a voltage was not applied in Example 1.

Comparative Example 4

Refined hydrocarbons were obtained under the same conditions as those in Example 1, except that dimethyl disulfide was not mixed with the dehydrated first mixed solution in Example 1.

Evaluation Examples

Measurement Methods

After the dehydration process was completed, the contents of moisture and chlorine in the obtained mixed solution and the content of chlorine in the refined oil from which impurities were removed were measured through ICP and XRF analysis methods, and the measured results were shown.

A catalytic activity duration was measured and expressed in hours based on the time point when the content of nitrogen in the refined oil exceeded 10 ppm by performing Total Nitrogen & Sulfur (TNS element) analysis on the refined oil.

In addition, the refining process of each of Examples and Comparative Examples was operated for three months, and a particle adhesion rate was measured according to the following Equation 1.

[Equation 1]

Particle adhesion rate (%) =

(Amount of impurity particles adhering to electrode/

Amount of impurity particles in pyrolysis oil) × 100

The measurement results are shown in Table 1.

TABLE 1

|  |  | Example 1 | Example 2 | Example 3 | Example 4 | Example 5 | Example 6 |
|---|---|---|---|---|---|---|---|
| Dehydration | Washing water (volume ratio) | 0.25 | 0.50 | 0.25 | 0.25 | 0.25 | 0.25 |
|  | Demulsifier (volume ratio) | 0.0001 | 0.0001 | 0.00001 | 0.0001 | 0.0001 | 0.00001 |
|  | Temperature (° C.) | 150 | 150 | 150 | 150 | 120 | 120 |
|  | Pressure (bar) | 10 | 10 | 10 | 10 | 10 | 10 |
|  | Voltage Type | AC | AC | AC | DC | AC | AC |
|  | Electrode | Vertical | Vertical | Vertical | Horizontal | Vertical | Vertical |
|  | Presence or absence of coalescer | X | X | X | X | X | X |
| First hydrotreating | Whether sulfur source is mixed or not | ○ | ○ | ○ | ○ | ○ | ○ |
|  | Temperature (° C.) | 300 | 300 | 300 | 300 | 300 | 300 |
|  | Pressure (bar) | 70 | 70 | 70 | 70 | 70 | 180 |
| Content of moisture after dehydration (ppm) |  | 592 | 783 | 672 | 595 | 721 | 895 |
| Content of Cl after dehydration (ppm) |  | 562 | 552 | 614 | 560 | 646 | 739 |
| Catalytic activity duration (hr) |  | >720 | >720 | >720 | >720 | >720 | >720 |
| Content of Cl in refined oil (ppm) |  | <1 | <1 | <1 | <1 | <1 | <1 |
| Particle adhesion rate (%) |  | 0.20 | 0.18 | 0.20 | 3.5 | 0.21 | 0.20 |

|  |  | Example 7 | Comparative Example 1 | Comparative Example 2 | Comparative Example 3 | Comparative Example 4 |
|---|---|---|---|---|---|---|
| Dehydration | Washing water (volume ratio) | 0.25 | — | 0.25 | 0.25 | 0.25 |
|  | Demulsifier (volume ratio) | 0.0001 | 0.0001 | — | 0.0001 | 0.0001 |
|  | Temperature (° C.) | 150 | 150 | 150 | 150 | 150 |
|  | Pressure (bar) | 10 | 10 | 10 | 10 | 10 |
|  | Voltage Type | AC | AC | AC | — | AC |
|  | Electrode | Vertical | Vertical | Vertical | — | Vertical |
|  | Presence or absence of coalescer | ○ | X | X | X | X |
| First hydrotreating | Whether sulfur source is mixed or not | ○ | ○ | ○ | ○ | X |
|  | Temperature (° C.) | 300 | 300 | 300 | 300 | 300 |
|  | Pressure (bar) | 70 | 70 | 70 | 70 | 70 |
| Content of moisture after dehydration (ppm) |  | 510 | 2485 | 4416 | 3840 | 610 |
| Content of Cl after dehydration (ppm) |  | 483 | 1024 | 1118 | 1105 | 564 |
| Catalytic activity duration (hr) |  | >720 | <576 | <576 | <576 | <336 |
| Content of Cl in refined oil (ppm) |  | <1 | 13.7 | 18.0 | 16.8 | 11.7 |
| Particle adhesion rate (%) |  | 0.18 | 0.24 | 0.21 | — | 0.20 |

As shown in Table 1, in Comparative Examples 1 to 3, the addition of washing water, addition of demulsifier, and application of voltage were set differently from Examples, and as a result, the effect of removing moisture and Cl by the dehydration process was poor. As waste plastic pyrolysis oil containing a large amount of impurities was hydrotreated, the content of Cl in the refined oil was high, and the hydrotreating catalyst was deactivated relatively quickly. In Comparative Example 4, it was confirmed that although moisture and some impurities in the waste plastic pyrolysis oil were sufficiently removed in the dehydration process, the hydrotreating catalyst was deactivated within a short time due to an insufficient content of sulfur, and thus, when the refining process was maintained for a long period time, the content of Cl in the refined oil was high as in other Comparative Examples. In addition, it may be expected that the content of refined oil in the mixed oil added to the distillation column is inevitably limited because Cl contained in a large amount in the refined oil has a potential to cause corrosion of the distillation column.

However, in Examples 1 to 7 according to a method for producing refined hydrocarbons from waste plastic pyrolysis oil of the present disclosure, a significant amount of moisture contained in the waste plastic pyrolysis oil was removed through the dehydration process, and a sulfur source was added, and as a result, the activity of the hydrotreating catalyst was maintained for a remarkably long time. In addition, as some water-soluble impurities were preemptively removed in the dehydration process and hydrotreating was performed, a content of impurities such as Cl in the refined oil was low. Therefore, it was confirmed that a large amount of refined oil was added in the isomerization process even when the impurities were not additionally removed.

Meanwhile, when an alternating voltage was applied using a vertical electrode, it was confirmed that the adhesion rate of impurity particles derived from char in the pyrolysis oil to the electrode surface was significantly low even when the process was continued for longer than three months. Through this, it was appreciated that when an alternating voltage was applied or a vertical electrode was used, there was no need to stop the process for washing the inside of the reactor, and as a result, more excellent process efficiency was exhibited.

In addition, in the case of Example 6, although the dehydration result was poor compared to other Examples, the content of Cl impurities in the refined hydrocarbons was significantly low as the hydrotreating was performed under a high pressure condition. However, since ammonia and hydrogen chloride were produced in excess due to the high pressure, it was confirmed that a relatively large amount of ammonium salt was formed even at the temperature at which the hydrotreating was performed.

In Example 7, as the additional dehydration was performed using a coalescer, the contents of moisture and chlorine after the dehydration were lower than those in other Examples. Therefore, it may be expected that the activation time of the catalyst, the process stability, and the quality of refined hydrocarbons are relatively superior to those in other Examples.

As set forth above, the method and system for producing refined hydrocarbons from waste plastic pyrolysis oil according to the embodiments of the present disclosure may minimize formation of an ammonium salt ($NH_4Cl$) in a refining process of waste plastic pyrolysis oil containing impurities including chlorine and nitrogen.

The method and system for producing refined hydrocarbons from waste plastic pyrolysis oil according to the embodiments of the present disclosure may prevent deactivation of the catalyst due to moisture, such that the refining efficiency may be excellent, and the process may be operated for a long period of time.

The method and system for producing refined hydrocarbons from waste plastic pyrolysis oil according to the embodiments of the present disclosure may provide high-octane refined hydrocarbons having a low content of impurities such as chlorine, nitrogen, oxygen, and metals and a low content of olefins.

The method and system for producing refined hydrocarbons from waste plastic pyrolysis oil according to the embodiments of the present disclosure may be used in production of eco-friendly oil refining and petrochemical products using waste plastics as a feedstock.

Although the embodiments of the present disclosure have been described, the present disclosure is not limited to these embodiments, and those skilled in the art will appreciate that various modifications and alterations may be made without departing from the concept and scope of the claims described below.

While the present disclosure has been shown and described with reference to certain embodiments thereof, it will be understood by those skilled in the art that various changes in form and details may be made therein without departing from the scope of the present disclosure and any equivalents. Therefore, the scope of the present disclosure should not be limited to the above-described embodiments but should include the equivalents thereof.

In the above-described embodiments, all operations may be selectively performed, or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

Figure 2:
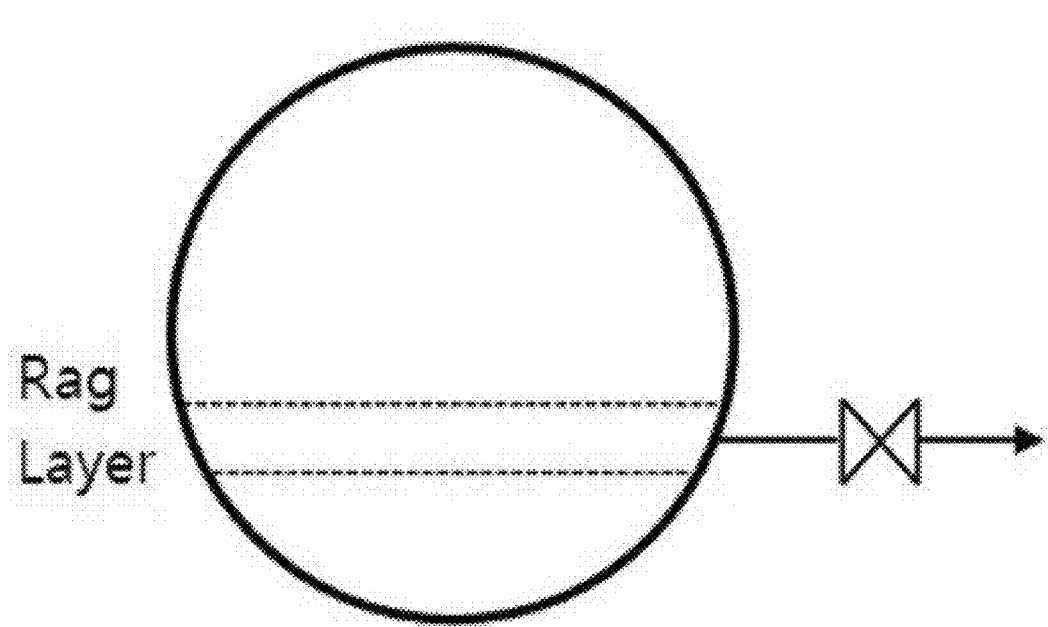
FIG. 2 is a diagram of dehydrator used in a system for producing refined hydrocarbons from waste plastic pyrolysis oil according to an embodiment of the present disclosure.

LIST OF NUMERALS IN THE FIGURES 2 waste plastic pyrolysis oil
4 feed tank
6 water
8 demulsifier
10 dehydrator
12 coalescer
14 dehydrated first mixed solution
16 recycle gas
17 $H_2$
18 Sulfur source
20 hydrotreating reactor
21 hydrotreated second mixed solution
22-1 to 22-4 gas liquid separators
24 off-gas
26 refined oil
28 fractionator
30 isomerization reactor
32 refined hydrocarbons

What is claimed is:

1. A method for producing refined hydrocarbons from waste plastic pyrolysis oil, the method comprising:
a dehydration operation applying a voltage to a first mixed solution comprising waste plastic pyrolysis oil, washing water, and a demulsifier to provide a dehydrated solution;
a hydrotreating operation hydrotreating a second mixed solution comprising the dehydrated solution and a sulfur source to produce a stream comprising refined oil;
a gas-liquid separation operation separating the stream to produce a gas stream comprising hydrogen gas and a liquid stream comprising the refined oil;
a recycling operation recycling the hydrogen gas in the gas stream directly to the hydrotreating operation; and
an isomerization operation subjecting the refined oil in the liquid stream to isomerization.

2. The method of claim 1, wherein in the dehydration operation the waste plastic pyrolysis oil is included in a greater volume than the washing water.

3. The method of claim 2, wherein the waste plastic pyrolysis oil and the washing water are included in the first mixed solution at a volume ratio of 1:0.001 to 1:0.5.

4. The method of claim 1, wherein the waste plastic pyrolysis oil and the demulsifier are included in the first mixed solution at a volume ratio of 1:0.000001 to 1:0.001.

5. The method of claim 1, wherein the voltage is applied as an alternating current or a combination of an alternating current and a direct current.

6. The method of claim 1, wherein the voltage is applied through at least one pair of vertical electrodes.

7. The method of claim 1, further comprising, after the application of the voltage in the dehydration operation, removing a rag layer from the dehydrated solution.

8. The method of claim 1, wherein the dehydration operation is performed under a temperature condition of 20° C. to 300° C.

9. The method of claim 1, wherein a ratio of a content of moisture in the waste plastic pyrolysis oil to a content of moisture in the dehydrated solution is 1:0.0001 to 1:0.9.

10. The method of claim 1, wherein the dehydrated solution is additionally dehydrated by condensation of moisture.

11. The method of claim 1, wherein a weight ratio of nitrogen to chlorine in the second mixed solution is 1:1 to 1:10.

12. The method of claim 1, wherein the sulfur source includes sulfur-containing oil.

13. The method of claim 12, wherein the sulfur-containing oil is included in an amount of less than 0.5 parts by weight with respect to 100 parts by weight of the dehydrated solution.

14. The method of claim 1, wherein the sulfur source includes one or more sulfur-containing organic compounds selected from the group consisting of a disulfide-based compound, a sulfide-based compound, a sulfonate-based compound, and a sulfate-based compound.

15. The method of claim 1, wherein the hydrotreating is performed in the presence of a molybdenum-based hydrotreating catalyst.

16. The method of claim 15, wherein the molybdenum-based hydrotreating catalyst is a catalyst in which molybdenum, or molybdenum and one or more of nickel, cobalt, and tungsten are supported on a support.

17. The method of claim 1, wherein the hydrotreating is performed under a pressure condition of 50 bar to 150 bar.

18. The method of claim 1, wherein the isomerization operation further comprises distilling the refined oil before isomerization.

19. The method of claim 1, wherein the refined oil from the liquid stream is mixed with petroleum hydrocarbons prior to the isomerization operation.

* * * * *